(12) United States Patent
Alber

(10) Patent No.: US 10,647,442 B2
(45) Date of Patent: May 12, 2020

(54) SINGLE ENGINE, ASYMMETRICAL VERTICAL TAKE-OFF AND LANDING (VTOL) AIRCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 385 days.

(21) Appl. No.: 15/543,443

(22) PCT Filed: Nov. 16, 2015

(86) PCT No.: PCT/US2015/060805
§ 371 (c)(1),
(2) Date: Jul. 13, 2017

(87) PCT Pub. No.: WO2016/114851
PCT Pub. Date: Jul. 21, 2016

(65) Prior Publication Data
US 2018/0022467 A1    Jan. 25, 2018

Related U.S. Application Data

(60) Provisional application No. 62/104,433, filed on Jan. 16, 2015.

(51) Int. Cl.
*B64D 35/04* (2006.01)
*B64C 29/02* (2006.01)
(Continued)

(52) U.S. Cl.
CPC .............. *B64D 35/04* (2013.01); *B64C 27/82* (2013.01); *B64C 29/02* (2013.01); *B64C 39/024* (2013.01);
(Continued)

(58) Field of Classification Search
CPC .............. B64C 2201/044; B64C 29/02; B64C 2201/088; B64D 35/04; B64D 27/12
See application file for complete search history.

(56) References Cited

U.S. PATENT DOCUMENTS 3,035,789 A     5/1962  Young
5,054,716 A    10/1991  Wilson
(Continued)

FOREIGN PATENT DOCUMENTS

GB           500541        2/1939

OTHER PUBLICATIONS

Notification of Transmital of the International Search Report for International Application No. PCT/US2015/060805; International Filing Date: Nov. 16, 2015; dated Apr. 22, 2016; pp. 1-9.
(Continued)

*Primary Examiner* — Brian M O'Hara
(74) *Attorney, Agent, or Firm* — Cantor Colburn LLP

(57) ABSTRACT

A vertical take-off and landing (VTOL) aircraft is provided and includes wings, first and second nacelles supported on each of the wings, each of the first and second nacelles including a propeller drivable to generate aircraft thrust, and an asymmetrical power generation unit. The asymmetrical power generation unit includes a single engine unit disposed in only one of the first and second nacelles to generate power to drive the propellers of both the first and second nacelles.

15 Claims, 7 Drawing Sheets

(51) Int. Cl.
*B64D 27/06* (2006.01)
*B64C 27/82* (2006.01)
*B64D 27/12* (2006.01)
*B64C 39/02* (2006.01)

(52) U.S. Cl.
CPC ............ *B64D 27/06* (2013.01); *B64D 27/12* (2013.01); *B64C 2201/028* (2013.01); *B64C 2201/088* (2013.01); *B64C 2201/104* (2013.01); *B64C 2201/165* (2013.01); *Y02T 50/44* (2013.01)

(56) References Cited

U.S. PATENT DOCUMENTS

| | | | |
|---|---|---|---|
| 5,765,783 A * | 6/1998 | Albion | B64C 29/02 244/17.23 |
| 6,279,852 B1 | 8/2001 | Dusserre-Telmon et al. | |
| 9,676,488 B2 * | 6/2017 | Alber | B64C 29/02 |
| 2007/0215751 A1 | 9/2007 | Robbins et al. | |
| 2014/0008486 A1 | 1/2014 | Alber et al. | |
| 2019/0135427 A1* | 5/2019 | Robertson | B64C 29/02 |

OTHER PUBLICATIONS

Written Opinion of the International Searching Authority for International Application No. PCT/US2015/060805; International Filing Date: Nov. 16, 2015; dated Apr. 22, 2016; pp. 1-5.

* cited by examiner

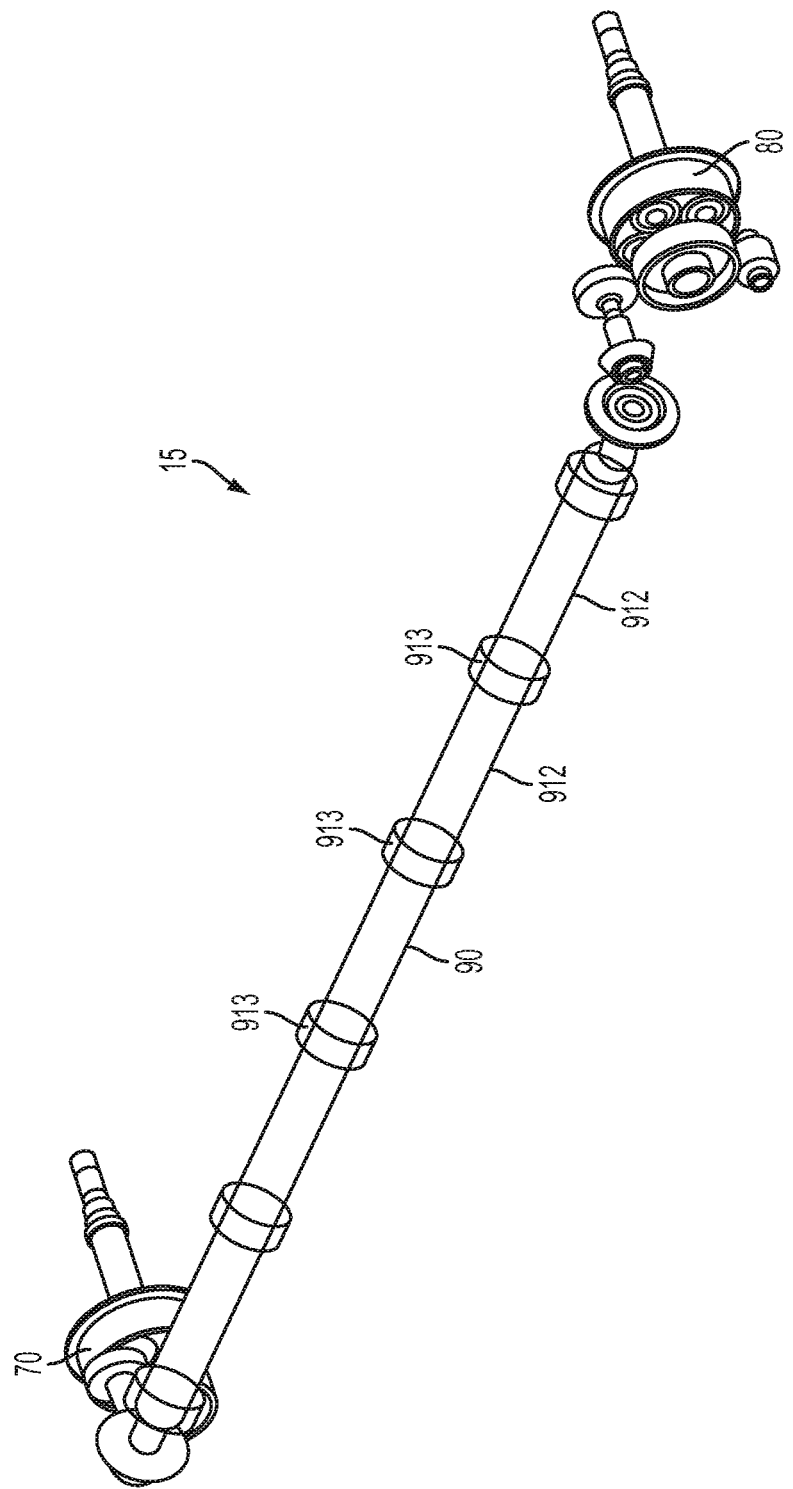

SINGLE ENGINE, ASYMMETRICAL VERTICAL TAKE-OFF AND LANDING (VTOL) AIRCRAFT

CROSS REFERENCE TO RELATED APPLICATIONS

This application is a National Stage application of PCT/US2015/060805, filed Nov. 16, 2015, which claims the benefit of U.S. Provisional Application No. 62/104,433, filed Jan. 16, 2015, both of which are incorporated by reference in their entirety herein.

STATEMENT OF FEDERALLY SPONSORED RESEARCH AND DEVELOPMENT

This invention was made with government support with the United States Government under Contract No. HR0011-14-C-0040. The government therefore has certain rights in this invention.

BACKGROUND OF THE INVENTION

The subject matter disclosed herein relates to a vertical take-off and landing (VTOL) aircraft and, more particularly, to a single engine, asymmetrical VTOL aircraft.

Aircraft missions often require VTOL capability that is combined with long range and endurance and can be very demanding. Conventional configurations of such aircraft are designed primarily for efficient forward flight, for efficient vertical lift or a poor compromise solution that permits both forward and vertical flight. Alternatively, some configurations include tilt-wing or tilt-rotor features that allow tilting of the fuselage with respect to the nacelles and have VTOL capabilities, long range and endurance but pay a high penalty in terms of complexity, higher empty weight and other inefficiencies.

One particular configuration is a rotor blown wing (RBW) configuration where a hybrid aircraft can fly as a rotorcraft and as a fixed wing aircraft. In such cases, a single engine capability for the aircraft may be warranted based on mission requirements, engine availability and operational benefits of a single vs. a twin engine arrangement. Normally, however, the single engine would be located within the center fuselage section of the aircraft and thus would require a center engine underslung configuration or a center engine coplanar configuration to transmit power to both engine nacelles. In each case, the weight impact can be relatively high due to added drive system components.

BRIEF DESCRIPTION OF THE INVENTION

According to one aspect of the invention, a vertical take-off and landing (VTOL) aircraft is provided and includes wings, first and second nacelles supported on each of the wings, each of the first and second nacelles including a propeller drivable to generate aircraft thrust, and an asymmetrical power generation unit. The asymmetrical power generation unit includes a single engine unit disposed in only one of the first and second nacelles to generate power to drive the propellers of both the first and second nacelles.

In accordance with additional or alternative embodiments, the aircraft further includes a fuselage from which the wings extend outwardly.

In accordance with additional or alternative embodiments, the fuselage and the other of the first and second nacelles encompass at least one or more of aircraft electronic components, payload elements and fuel.

In accordance with additional or alternative embodiments, the single engine unit includes a gas turbine engine.

In accordance with additional or alternative embodiments, the single engine unit includes an output shaft, a compressor-combustor-turbine (CCT) section to compress inlet air, to mix the compressed air with fuel, to combust the mixture to produce high energy fluids and to expand the high energy fluids to generate rotational energy to rotate the output shaft and an exhaust duct by which remaining high energy fluids are exhausted.

In accordance with additional or alternative embodiments, the aircraft further includes a first gearbox assembly to which the output shaft is coupled and which is configured to drive the propeller of the first nacelle, a second gearbox assembly configured to drive the propeller of the second nacelle and a drive shaft assembly by which rotation of the first gearbox assembly is transmitted to the second gearbox assembly.

In accordance with additional or alternative embodiments, the first and second gearbox assemblies are configured to gear up or down rotations of the output shaft.

In accordance with additional or alternative embodiments, the drive shaft assembly includes respective series of shaft sections and bearings.

In accordance with additional or alternative embodiments, the aircraft further includes alighting elements forming at least a three-point stable support system for the aircraft.

According to another aspect of the invention, a vertical take-off and landing (VTOL) aircraft is provided and includes a fuselage, first and second wings extending outwardly from sides of the fuselage, first and second nacelles supported on each of the first and second wings, each of the first and second nacelles including a propeller drivable to generate aircraft thrust and an asymmetrical power generation unit including a single engine unit disposed in only one of the first and second nacelles to generate power to drive the propellers of both the first and second nacelles. The fuselage and the other of the first and second nacelles encompass at least one or more of aircraft electronic components, payload elements and fuel.

In accordance with additional or alternative embodiments, the single engine unit includes an output shaft, a compressor-combustor-turbine (CCT) section to compress inlet air, to mix the compressed air with fuel, to combust the mixture to produce high energy fluids and to expand the high energy fluids to generate rotational energy to rotate the output shaft and an exhaust duct by which remaining high energy fluids are exhausted.

In accordance with additional or alternative embodiments, the aircraft further includes a first gearbox assembly to which the output shaft is coupled and which is configured to drive the propeller of the first nacelle, a second gearbox assembly configured to drive the propeller of the second nacelle and a drive shaft assembly by which rotation of the first gearbox assembly is transmitted to the second gearbox assembly.

In accordance with additional or alternative embodiments, the first and second gearbox assemblies are configured to gear up or down rotations of the output shaft.

In accordance with additional or alternative embodiments, the drive shaft assembly includes respective series of shaft sections and bearings.

In accordance with additional or alternative embodiments, the aircraft further includes alighting elements forming at least a three-point stable support system for the aircraft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a perspective view of components of the asymmetrical power generation unit of FIG. 6.

The detailed description explains embodiments of the invention, together with advantages and features, by way of example with reference to the drawings.

DETAILED DESCRIPTION OF THE INVENTION

As will be described below, a single engine is asymmetrically mounted in only a single engine nacelle in a rotor blown wing (RBW) aircraft. With this single engine configuration, power is delivered to a single, local gearbox where power and torque are split. The split power and torque are then sent to an additional gearbox on the opposite side of the aircraft where the opposite nacelle can carry additional useful loads, such as payload or fuel in the space that would otherwise be reserved for a second engine. Two alighting (landing) elements can be located away from the engine exhaust on the engine nacelle with the other nacelle incorporating a single or double alighting element configuration.

Figure 1:
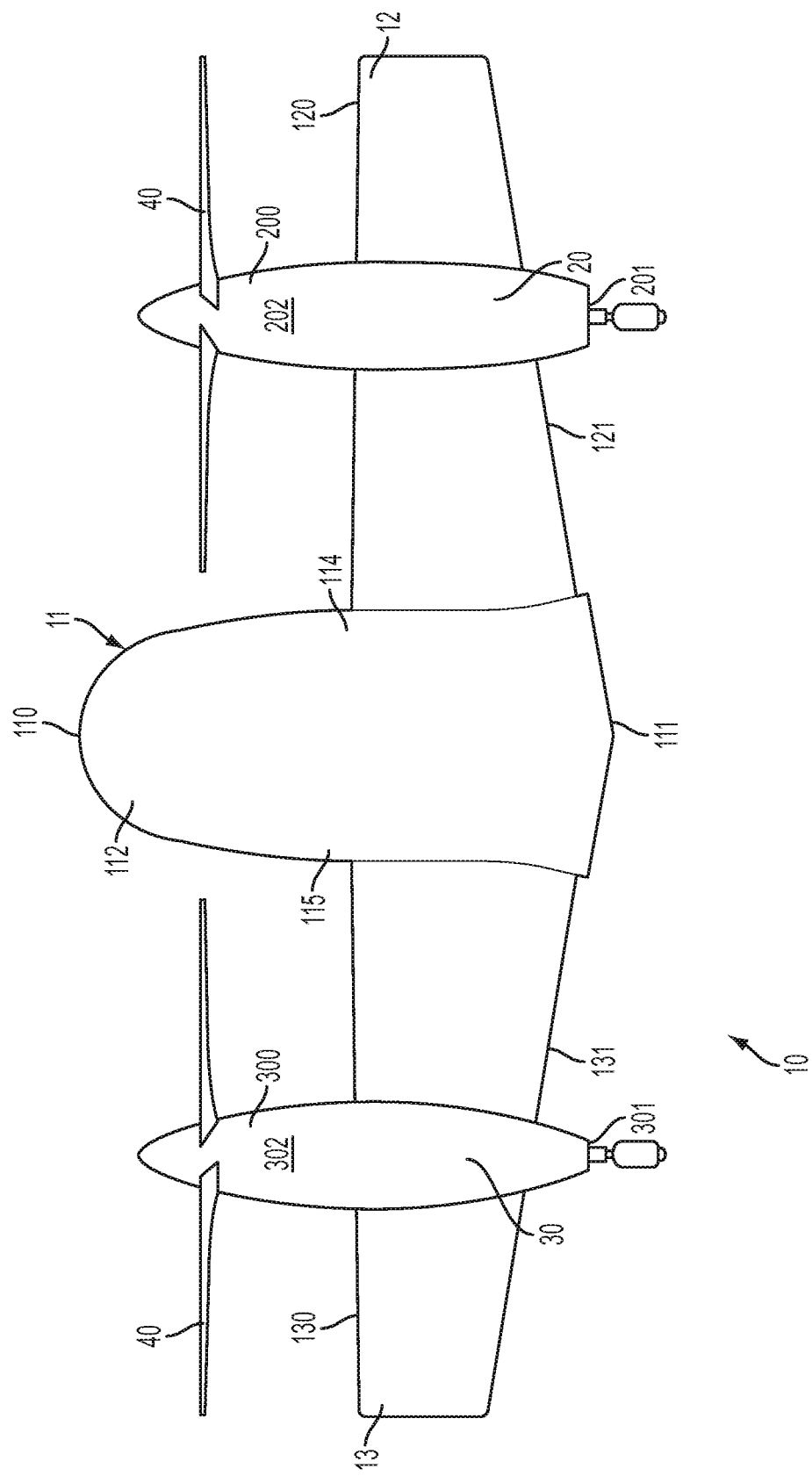
FIG. 1 is an elevation view of a vertical take-off and landing (VTOL) aircraft in a grounded condition in accordance with embodiments.
Figure 2:
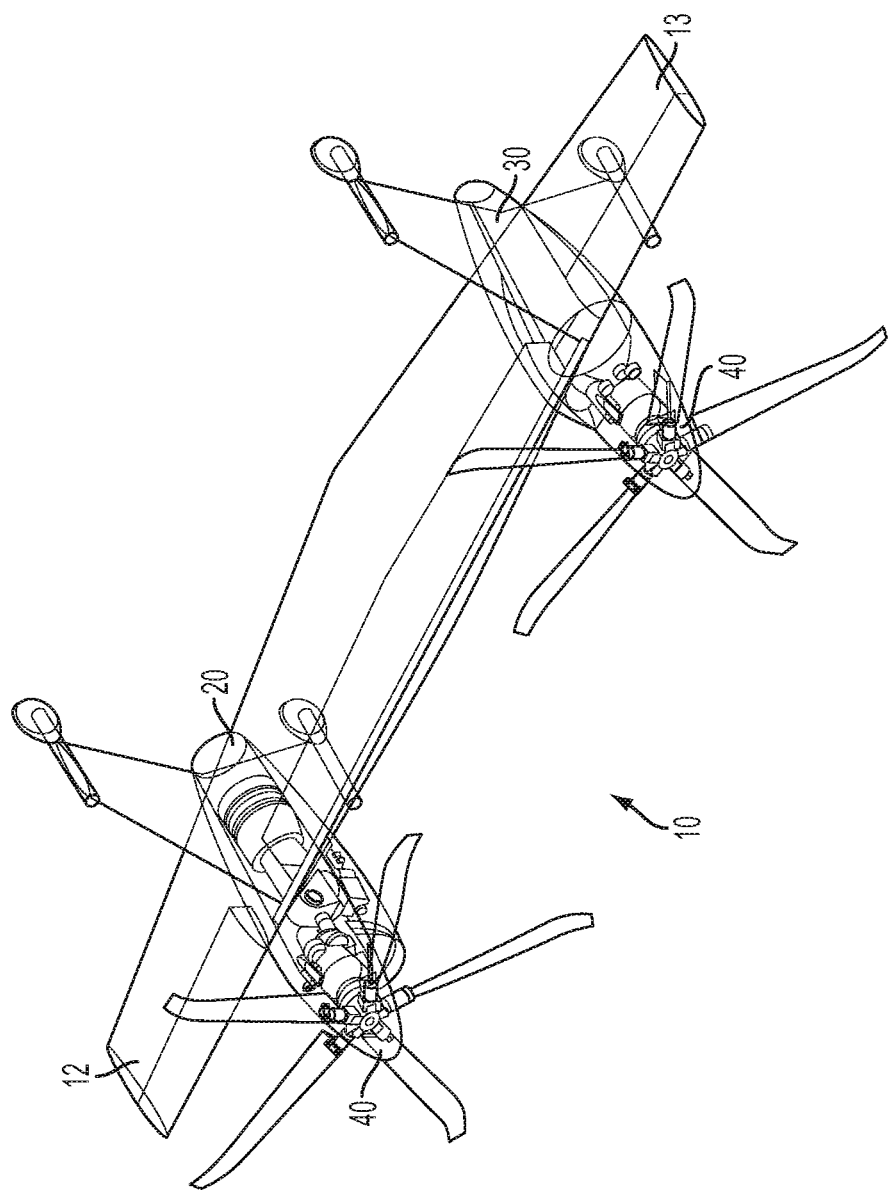
FIG. 2 is a perspective skeletal view of the VTOL aircraft of FIG. 1.
Figure 3:
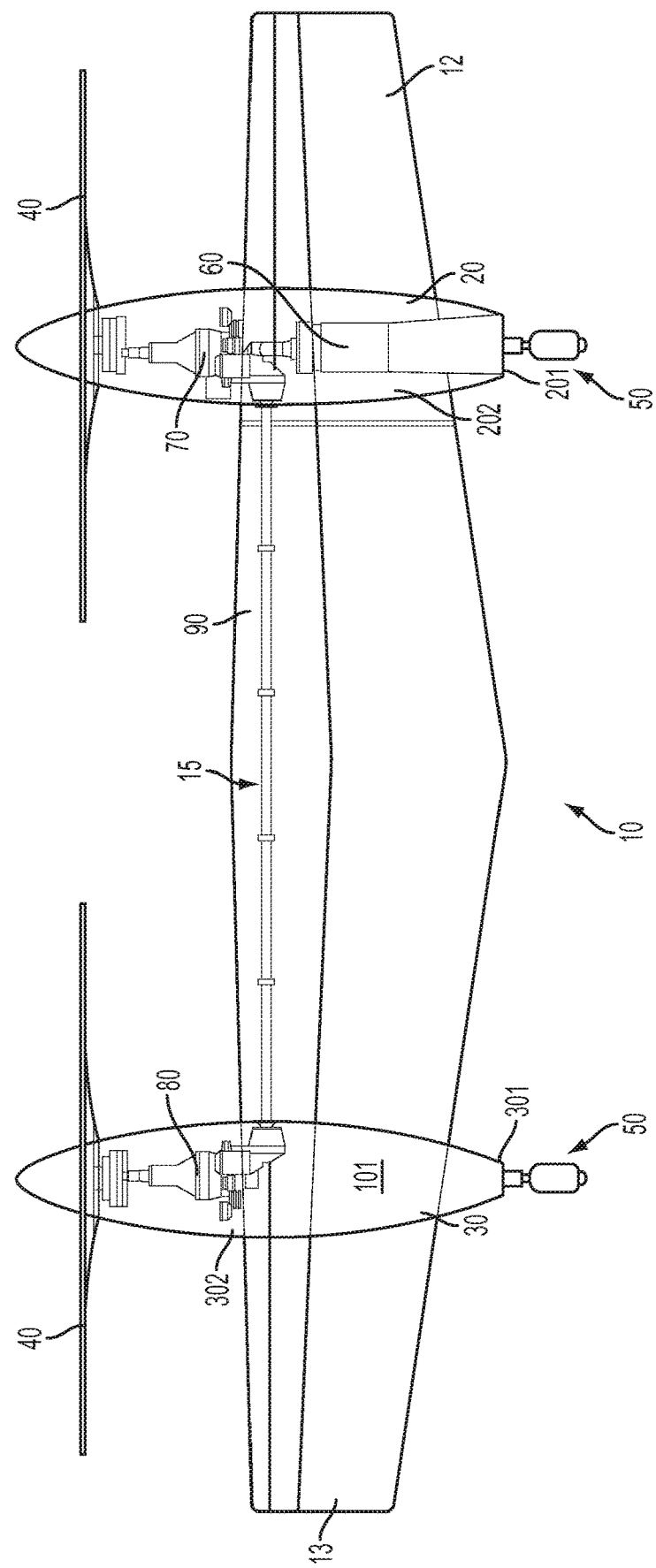
FIG. 3 is an elevation, skeletal view of the VTOL aircraft of FIG. 1 and an asymmetrical power generation unit thereof in accordance with embodiments.

With reference to FIGS. 1-3, a rotor blown wing (RBW) vertical take-off and landing (VTOL) aircraft 10 is provided. The aircraft 10 may include, but is not required to include, a fuselage 11 (see FIGS. 1, 3, 4 and 5). When used as shown in FIG. 1, the fuselage 11 has an aerodynamic shape with a tapered nose section 110, a trailing end portion 111 opposite from the nose section 110 and an airframe 112. The airframe 112 is generally smooth but may include sensor components protruding into or out of the airframe 112. The airframe 112 may or may not have a dorsal fin or horizontal or vertical stabilizer elements. The airframe 112 has first and second opposite sides 114 and 115 and is formed and sized to encompass at least one or more of aircraft electronic components, payload elements and fuel. Although the fuselage 11 is illustrated in FIG. 1 as having a blunted nose, it is to be understood that other shapes (e.g., delta-wing shapes) are possible.

The aircraft 10 further includes first and second wings 12 and 13 that extend outwardly from the first and second opposite sides 114 and 115 of the airframe 112, respectively, when the aircraft 10 includes the fuselage 11, a first nacelle 20 supported on the first wing 12, a second nacelle 30 supported on the second wing 13, a rigid rotor propeller 40 disposed on each of the first and second nacelles 20 and 30 and a flight computer. When the aircraft 10 does not include the fuselage 11, as shown in FIGS. 2 and 3, the first and second wings 12 and 13 may be joined directly to one another with the first and second nacelles 20 and 30 still supported on the first and second wings 12 and 13, respectively.

The first and second wings 12 and 13 may be foldable about hinges disposed along the first and second wings 12 and 13 proximate to the first and second nacelles 20 and 30 and are substantially similar in shape and size. In accordance with embodiments, the first and second wings 12 and 13 may be configured as high aspect ratio wings that have a span or longitudinal length that substantially exceeds a chord where the span or longitudinal length is measured from the first and second opposite sides 114 and 115 to distal tips of the first and second wings 12 and 13 and the chord is measured from the leading edges 120/130 to the trailing edges 121/131 of the first and second wings 12 and 13. In accordance with further embodiments, the leading edges 120/130 may be un-swept and the trailing edges 121/131 may be forwardly swept.

The first and second nacelles 20 and 30 are supported on each of the first and second wings 12 and 13 at about 40-60% span locations, respectively. The first and second nacelles 20 and 30 have an aerodynamic shape with forward sections 200, 300, trailing end portions 201, 301 opposite from the forward sections 200, 300 and nacelle frames 202, 302. The nacelle frame 202 is generally smooth and formed and sized to encompass an engine unit (e.g., a gas turbine engine or an electronic motor-generator) as will be described below. The nacelle frame 302 is also generally smooth and formed and sized to encompass aircraft electronic components, payload elements and/or fuel. It will be understood of course that this configuration can be reversed with the engine unit being encompassed within the nacelle frame 302 and the aircraft electronic components, payload elements and/or fuel encompassed within the nacelle frame 202. For purposes of clarity and brevity, however, the following description will relate to only the former case.

The rigid rotor propellers 40 are disposed at the forward sections 200, 300 on each of the first and second nacelles 20 and 30. Each of the rigid rotor propellers 40 is drivable to rotate about only a single rotational axis, which is defined along and in parallel with a longitudinal axis of the corresponding one of the first and second nacelles 20 and 30. Power required for driving the rotations of the rigid rotor propellers 40 may be generated from the engine unit encompassed within the nacelle frame 202. Where this engine unit is located remotely from the rigid rotor propeller 40 of the second nacelle 30, the aircraft 10 may further include a laterally oriented drive shaft for transmission of power generated by the gas turbine engine or electronic couplings running laterally along the aircraft 10 for transmission of power generated by the electronic motor-generator. Such a transmission system will be described in greater detail below.

Each rigid rotor propeller 40 includes a hub and rotor blades that extend radially outwardly from the hub. As the rigid rotor propellers 40 are driven to rotate, the rotor blades rotate about the rotational axes and aerodynamically interact with the surrounding air to generate lift and thrust for the aircraft 10. The rotor blades are also controllable to pitch about respective pitch axes that run along their respective longitudinal lengths. Such rotor blade pitching can be commanded collectively or cyclically by at least the flight computer, which may be embodied in the aircraft electronic components of one or more of the fuselage 11 and the second nacelle 30. Collective pitching of the rotor blades increases or decreases an amount of lift and thrust the rigid rotor propellers 40 generate for a given amount of applied torque. Cyclic pitching of the rotor blades provides for navigational and flight control of the aircraft 10.

Each of the rigid rotor propellers 40 may be fully cyclically controllable by rotor controls (i.e., cyclic and collective functions using servo actuators, a swashplate and pitch change rod mechanisms) with signal inputs from a flight computer. This full cyclic control may be referred to as active proprotor control and permits the elimination of fixed wing controls (i.e., ailerons and elevons from the aircraft 10), which could lead to a further reduction in weight. In any case, the full cyclic control of the rigid rotor propellers 40 allows the aircraft 10 to take off and land vertically with the nose section 110 pointed upwardly while permitting a transition to wing borne flight. Such transition is effected by simply pitching the cyclic control forward to thereby cause the entire aircraft 10 to rotate from a vertical orientation to a horizontal orientation.

In order to reduce a footprint of the aircraft 10, each of the rigid rotor propellers 40 may include a set of rotor blades of which one may be a non-foldable rotor blade or a foldable rotor blade to reduce space when the aircraft is not operating, two may be opposed once-foldable rotor blades and one may be a twice-foldable rotor blade that is disposed opposite the non-foldable rotor blade. When the aircraft 10 is grounded or not in flight, the first and second wings 12 and 13, the once-foldable rotor blades and the twice foldable rotor blades may each assume their respective folded conditions. By contrast, when the aircraft 10 is prepped for flight conditions, the first and second wings 12 and 13, the once-foldable rotor blades and the twice foldable rotor blades may each assume their respective unfolded conditions.

In addition to the features described above and, with reference to FIGS. 3-5, the aircraft 10 may include alighting elements 50 coupled to the trailing end portions 201, 301 of each of the first and second nacelles 20 and 30. In accordance with embodiments, the alighting elements 50 may form at least a three-point or four-point, stable support system 500 (see the dotted lines of FIG. 4) that supports in the aircraft 10 against rolling over in any given direction. In this case, the second nacelle 30 has a single alighting element 51 disposed in line with its longitudinal axis. By contrast, the first nacelle 20 includes spires 52 extending away from a plane of the first wing 12 and dual alighting elements 53 at distal ends of the spires 52. The spires 52 allow for a positioning of the dual alighting elements 53 away from exhaust from the engine unit disposed in the first nacelle 20. The three-point stable support system 500 is thus provided by the combination of the single alighting element 51 and the dual alighting elements 53.

Figure 6:
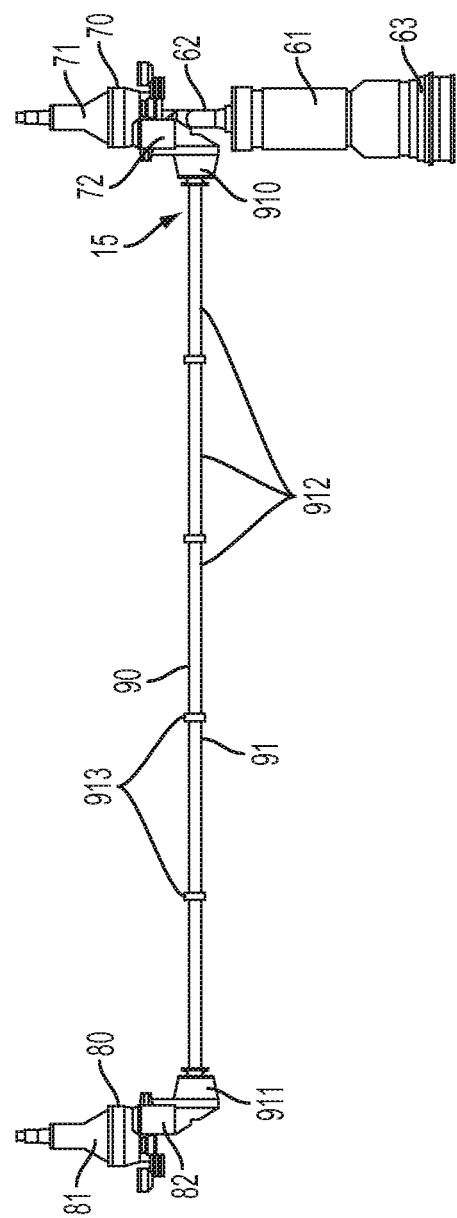
FIG. 6 is a top-down view of the asymmetrical power generation unit of the VTOL aircraft of FIGS. 1-3.

With reference to FIGS. 3, 6 and 7, the aircraft 10 includes an asymmetrical power generation unit 15. The asymmetrical power generation unit 15 includes a single engine unit 60 disposed in only one of the first and second nacelles 20 and 30 (i.e., within the nacelle frame 202 of the first nacelle 20) to generate power to drive the propellers 40 of both the first and second nacelles 20 and 30. In addition, the aircraft includes a first gearbox assembly 70, a second gearbox assembly 80 and a drive shaft assembly 90. In accordance with embodiments, while conventional VTOL aircraft with symmetric engine nacelle configurations may have relatively heavy engine components, the asymmetrical power generation unit 15 has a substantially reduced weight.

The single engine unit 60 is configured to generate power to be used to drive rotations of the propellers 40 and thus may be provided as a gas turbine engine 600 or an electric motor-generator. In the former case, where the single engine unit 60 is provided as the gas turbine engine, the drive shaft assembly 90 is provided as a drive shaft unit 91 that transmits rotational energy from the first nacelle 20 to the second nacelle 30. In the latter case, where the single engine unit 60 is provided as the electrical motor-generator, the drive shaft assembly 90 may be provided as electrical couplings that are disposed to transmit electrical power from the first nacelle 20 to the second nacelle 30. While each case is encompassed by this disclosure, for purposes of clarity and brevity, only the case of the single engine unit 60 being a gas turbine engine and the drive shaft assembly 90 being a drive shaft unit 91 will be described in detail further.

In accordance with embodiments and, as shown in FIG. 6, the single engine unit 60 includes a compressor-combustor-turbine (CCT) section 61, an output shaft 62 and an exhaust duct 63. The CCT section 61 is configured to compress inlet air, to mix the compressed air with fuel, to combust the mixture to produce high energy fluids and to expand the high energy fluids to generate rotational energy. This rotational energy is then transmitted to the output shaft 62 to cause the output shaft 62 to rotate about its longitudinal axis as the remaining high energy fluids are exhausted from the nacelle frame 202 through the exhaust duct 63.

Although the embodiments of FIG. 6 relate to a gas turbine or turbo-shaft engine, it is to be understood that these embodiments are merely exemplary and that other configurations and engine types are possible. As examples, the other engine types may include, but are not limited to, rotary engines, internal combustion engines, electrical motor-generator engines and hybrid engines.

The output shaft 62 is coupled to the first gearbox assembly 70 such that the rotation of the output shaft 62 is transmitted to the first gearbox assembly 70, which is disposed to then drive rotations of the propeller 40 of the first nacelle 20. The first gearbox 70 may be provided as a 90 degree, multi-stage, multi-attitude gearbox and may include a gear train section 71 and a 90 degree power/torque splitting section 72. The gear train section 71 may be configured to gear up or down the rotations of the output shaft 62 such that the propeller 40 rotates at an appropriate speed and can be coupled to the flight computer such that the flight computer can control the gearing up or down. The 90 degree power/torque splitting section 72 is coupled to the drive shaft unit 91 such that rotation of the output shaft 62 transmitted to the first gearbox assembly 70 can also be transmitted to the drive shaft unit 91.

The drive shaft unit 91 is coupled to the second gearbox assembly 80 such that the rotation of the drive shaft unit 91 is transmitted to the second gearbox assembly 80, which is disposed to then drive rotations of the propeller 40 of the second nacelle 30. The second gearbox 80 may be provided as a 90 degree, multi-stage, multi-attitude gearbox and may include a gear train section 81 and a 90 degree power/torque receiving section 82. The gear train section 81 may be configured to gear up or down the rotations of the drive shaft unit 91 such that the propeller 40 rotates at an appropriate speed and can be coupled to the flight computer such that the flight computer can control the gearing up or down. The 90 degree power/torque receiving section 82 is coupled to the drive shaft unit 91 such that rotation of the drive shaft unit 91 can be transmitted to the second gearbox assembly 80.

The drive shaft unit 91 extends through the fuselage 11 and through the inward portions of the first and second wings 12 and 13 and may be provided as a plurality of shaft sections that are coupled together as a unit. The drive shaft unit 91 includes a first coupling unit 910 at a first end thereof, a second coupling unit 911 at a second end thereof, a series of shaft sections 912 provided in an end-to-end connected configuration between the first and second coupling units 910 and 911 and a series of bearings 913. The first coupling unit 910 is coupled to an end-most one of the shaft sections 912 and to the 90 degree power/torque splitting section 72 of the first gearbox assembly 70. The second coupling unit 911 is coupled to the other end-most one of the shaft sections 912 and to the 90 degree power/torque receiving section 82 of the second gearbox assembly 80. The bearings 913 may be provided as rotor bearings and are supportively disposed within the fuselage 11 and the first and second wings 12 and 13 to rotatably support the drive shaft unit 91.

Figure 4:
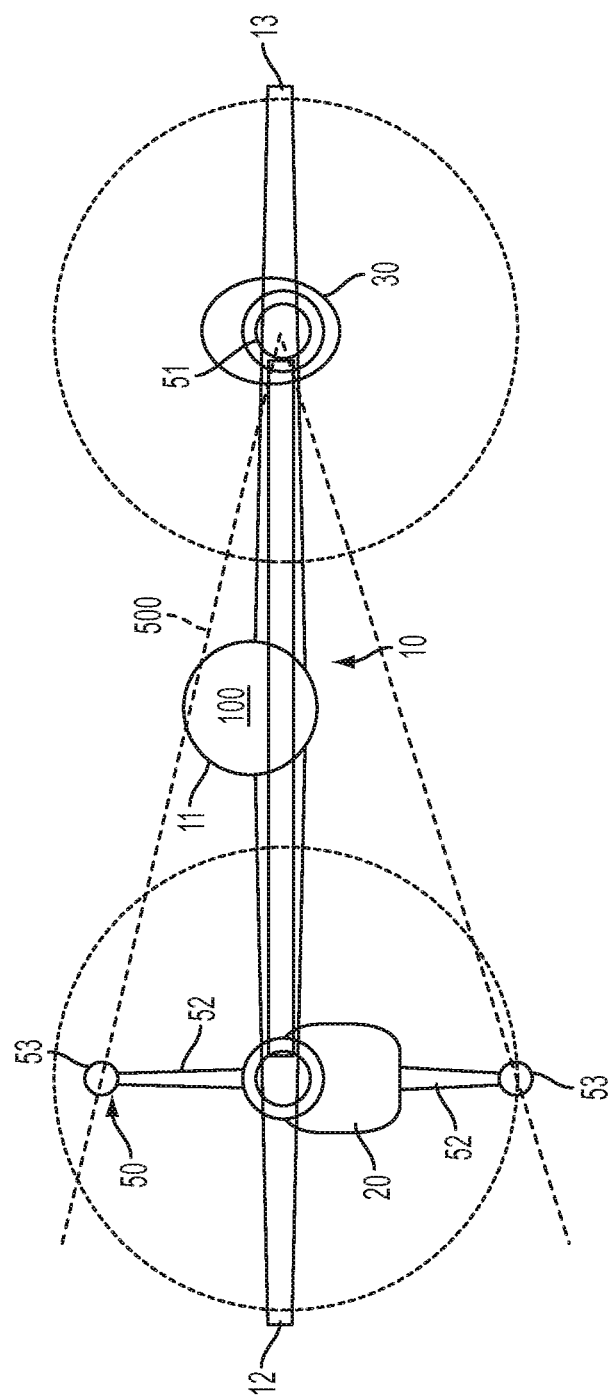
FIG. 4 is a front view of the VTOL aircraft of FIGS. 1-3 illustrating alighting element configurations in accordance with embodiments.
Figure 5:
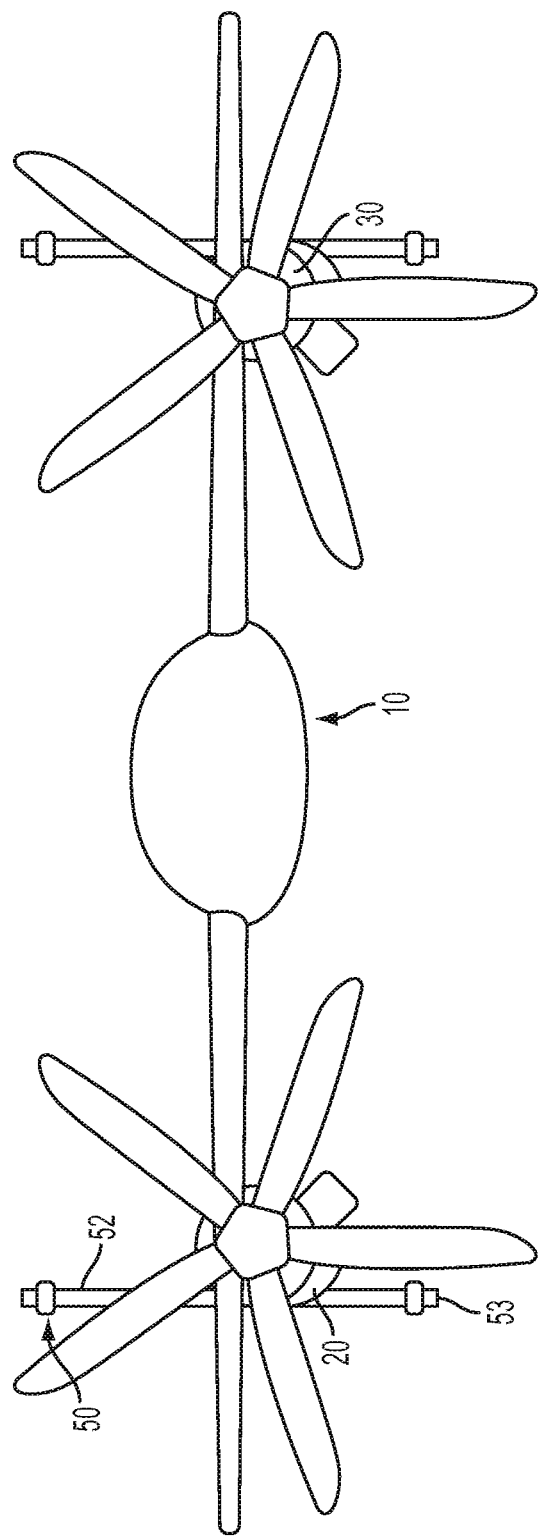
FIG. 5 is a front view of the VTOL aircraft of FIGS. 1-3 illustrating alighting element configurations in accordance with alternative embodiments.

In accordance with embodiments and, as shown in FIG. 4, the fuselage 11 may be formed to define an interior space 100 while, as shown in FIG. 3, the second nacelle 30 may be formed to define an interior nacelle space 101. In each case, the interior space 100 and the interior nacelle space 101 are sized to fit the above noted aircraft electronic components, payload elements and fuel in accordance with design considerations. In particular, the interior space 100 is sized to fit the aircraft electronic components, payload elements and fuel around the drive shaft unit 91 while the interior nacelle space 101 is sized to fit the aircraft electronic components, payload elements and fuel around the second gearbox assembly 80.

In accordance with further embodiments, the interior space 100 and the interior nacelle space 101 may be disposed to have fit therein fixed equipment like avionics, aircraft systems, auxiliary power units (APUs), fixed mission equipment, etc. The weight of such equipment may be used particularly in the interior nacelle space 101 to compensate for the weight of the single engine unit 70 in the first nacelle 20. In some cases, the weight compensation is such that the center of gravity (CG) of the aircraft 10 is located along or substantially close to a geometric centerline of the aircraft 10. To an extent that the CG is not located along or substantially close to the geometric centerline, the asymmetrical power generation unit 15 may be controlled variably at the first and second nacelles 20 and 30.

Moreover, to an extent that the weight of the equipment housed in the interior space 100 and the interior nacelle space 101 changes over time (i.e., due to expendables such as used fuel or equipment being discarded from the aircraft 10), the CG may correspondingly move relative to the geometric centerline during the course of a given mission. While expendables will normally be located at or near to the geometric centerline to minimize CG change when the aircraft 10 is loaded, offloaded or when expendables are released, it is possible that the CG may be initially set along or substantially close to the geometric centerline to later move away from this position or vice versa. In either case, ballast could be used or the asymmetrical power generation unit 15 may be controlled variably at the first and second nacelles 20 and 30 in order to compensate for in-mission movement of the CG. Furthermore, an acceptable displacement range of the CG relative to the geometric centerline can be pre-defined with an initial plan for housing equipment in the interior space 100 and the interior nacelle space 101 adjusted to insure that the CG does not exceed the displacement range during the given mission.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vertical take-off and landing (VTOL) aircraft, comprising:
    a first wing and a second wing;
    a first nacelle supported on the first wing and a second nacelle supported on the second wing,
    each of the first and second nacelles including a propeller drivable to generate aircraft thrust; and
    an asymmetrical power generation unit including a single engine unit disposed in only one of the first and second nacelles to generate power to drive the propellers of both the first and second nacelles.

2. The aircraft according to claim 1, further comprising a fuselage from which the first and second wings extend outwardly.

3. The aircraft according to claim 2, wherein the fuselage and the first nacelle or second nacelle not including the single engine unit encompass at least one or more of aircraft electronic components, payload elements and fuel.

4. The aircraft according to claim 1, wherein the single engine unit comprises a gas turbine engine.

5. The aircraft according to claim 1, wherein the single engine unit comprises:
    an output shaft;
    a compressor-combustor-turbine (CCT) section to compress inlet air, to mix the compressed air with fuel, to combust the mixture to produce high energy fluids and to expand the high energy fluids to generate rotational energy to rotate the output shaft; and
    an exhaust duct by which remaining high energy fluids are exhausted.

6. The aircraft according to claim 5, wherein the first nacelle includes the single engine unit and the aircraft further comprises:
    a first gearbox assembly to which the output shaft is coupled and which is configured to drive the propeller of the first nacelle;
    a second gearbox assembly configured to drive the propeller of the second nacelle; and
    a drive shaft assembly by which rotation of the first gearbox assembly is transmitted to the second gearbox assembly.

7. The aircraft according to claim 6, wherein the first and second gearbox assemblies are configured to gear up or down rotations of the output shaft.

8. The aircraft according to claim 6, wherein the drive shaft assembly comprises respective series of shaft sections and bearings.

9. The aircraft according to claim 1, further comprising alighting elements forming at least a three-point stable support system for the aircraft.

10. A vertical take-off and landing (VTOL) aircraft, comprising:
a fuselage;
a first wing and a second wing extending outwardly from sides of the fuselage;
a first nacelle supported on the first wing and a second nacelle supported on the second wing, each of the first and second nacelles including a propeller drivable to generate aircraft thrust; and
an asymmetrical power generation unit including a single engine unit disposed in only one of the first and second nacelles to generate power to drive the propellers of both the first and second nacelles,
wherein the fuselage and the first nacelle or second nacelle not including the single engine unit encompass at least one or more of aircraft electronic components, payload elements and fuel.

11. The aircraft according to claim 10, wherein the single engine unit comprises: an output shaft;
a compressor-combustor-turbine (CCT) section to compress inlet air, to mix the compressed air with fuel, to combust the mixture to produce high energy fluids and to expand the high energy fluids to generate rotational energy to rotate the output shaft; and
an exhaust duct by which remaining high energy fluids are exhausted.

12. The aircraft according to claim 11, wherein the first nacelle includes the single engine unit and the aircraft further comprises:
a first gearbox assembly to which the output shaft is coupled and which is configured to drive the propeller of the first nacelle;
a second gearbox assembly configured to drive the propeller of the second nacelle; and
a drive shaft assembly by which rotation of the first gearbox assembly is transmitted to the second gearbox assembly.

13. The aircraft according to claim 12, wherein the first and second gearbox assemblies are configured to gear up or down rotations of the output shaft.

14. The aircraft according to claim 12, wherein the drive shaft assembly comprises respective series of shaft sections and bearings.

15. The aircraft according to claim 10, further comprising alighting elements forming at least a three-point stable support system for the aircraft.

* * * * *